(12) United States Patent
Fujino et al.

(10) Patent No.: US 6,688,163 B2
(45) Date of Patent: Feb. 10, 2004

(54) DIAGNOSTIC SYSTEM FOR ENGINE

(75) Inventors: Kenichi Fujino, Shizuoka (JP); Kitoshi Motose, Shizuoka (JP)

(73) Assignee: Yamaha Marine Kabushiki Kaisha, Shizouka (JP)

( * ) Notice: Subject to any disclaimer, the term of this patent is extended or adjusted under 35 U.S.C. 154(b) by 46 days.

(21) Appl. No.: 09/746,436

(22) Filed: Dec. 21, 2000

(65) Prior Publication Data

US 2001/0032498 A1 Oct. 25, 2001

(30) Foreign Application Priority Data

Dec. 24, 1999 (JP) .......................................... 11-366325

(51) Int. Cl.$^7$ ............................................. G01M 15/00
(52) U.S. Cl. .......................................... 73/116; 73/116
(58) Field of Search ........................ 73/119, 116, 118.1, 73/862.191, 117.3; 123/198, 672, 674

(56) References Cited

U.S. PATENT DOCUMENTS

| 4,535,621 A | | 8/1985 | Gervais et al. |
| 4,977,872 A | | 12/1990 | Hartopp |
| 5,445,019 A | | 8/1995 | Glidewell et al. |
| 5,813,390 A | * | 9/1998 | Anamoto .................. 123/674 |
| 5,941,223 A | * | 8/1999 | Kato ......................... 123/679 |

* cited by examiner

Primary Examiner—Kamand Cuneo
Assistant Examiner—Monica D. Harrison
(74) Attorney, Agent, or Firm—Knobbe, Martens, Olson & Bear, LLP

(57) ABSTRACT

A diagnostic system is provided for aiding a technician or engineer in verifying that a combustion condition sensor provided with an engine is operating properly. The diagnostic system can be used to diagnose the operation of an oxygen sensor included with such an engine. The diagnostic system is configured to sample output voltages of the combustion condition sensor and compare such voltages with predetermined reference voltages.

31 Claims, 12 Drawing Sheets

Active Actuator Test

Active Actuator Test Ongoing

US 6,688,163 B2

DIAGNOSTIC SYSTEM FOR ENGINE

PRIORITY INFORMATION

This application is based on and claims priority to Japanese Patent Application No. 11-366325 filed Dec. 24, 1999, the entire contents of which is hereby expressly incorporated by reference.

BACKGROUND OF THE INVENTION

1. Field of the Invention

The present invention relates to a diagnostic system. More specifically, the present invention relates to a diagnostic system for a combustion condition sensor used with an engine.

2. Description of Related Art

In all fields of engine design, there is an increasing emphasis on obtaining more effective emission control, better fuel economy and, at the same time, continued high or higher power output. In pursuit of better fuel economy and emission control, various types of control systems have been developed in conjunction with internal combustion engines. One of the more effective types of controls is so-called "feedback" control. With this type of control, a baseline or "reference" air fuel ratio is set for the engine. Adjustments are then made from the baseline setting based upon output from a combustion condition sensor that senses the air fuel ratio within at least one combustion chamber of an engine in order to bring the air fuel ratio into a desire range.

Normally, the type of combustion condition sensor employed for such feedback control is an oxygen ($O_2$) sensor which outputs an electrical signal. When the output signal voltage is high, little oxygen is present in the exhaust, indicating that an air fuel charge combusted in the combustion chamber was "rich", i.e., more than the stoichiometric amount of fuel was present in the air/fuel charge. On the other hand, when the output signal voltage is low, substantial amounts of oxygen are present in the exhaust, thus indicating that a combusted charge was "lean", i.e., less than the stoichiometric amount of fuel was present in the air/fuel charge.

A conventional oxygen sensor is normally connect to a wave forming circuit which manipulates the output of the sensor to indicate an "on" signal when the voltage of the output signal exceeds a reference voltage (i.e., a signal which results when the supplied air/fuel charge is rich). On the other hand, the circuit manipulates the signal to indicate that the sensor is "off" when the voltage of the output signal does not exceed the reference voltage (i.e., a signal which results from a supplied air/fuel charge that is lean).

A control system incorporating such a sensor typically operates on a feedback control principal, continuously making corrections to accommodate deviations from the desired air/fuel ratio. Adjustments are made in stepped intervals until the sensor output goes to the opposite sense from its previous signal. For example, if the mixture is too rich in fuel (i.e., the sensor is "on") then the amount of fuel supplied to each fuel charge is reduced until the air/fuel ratio sensed is lean (i.e., the sensor signal turns "off"). Adjustments are then made back into the rich direction or back, thus approximately maintaining the desired ratio.

Most commonly, the oxygen sensor is the type which utilizes inner and outer platinum or platinum coated electrodes. However, due at least in part to the high operating temperature of such a sensor, the platinum acts as a catalyst, which catalyses the exhaust. For example, oxygen remaining in the exhaust may be catalyzed with carbon monoxide at the platinum electrode interface, creating carbon dioxide. Although the effects of the platinum in improving exhaust gas emissions may be advantageous, the oxygen content of the gas being sensed can be affected to a degree which causes the sensor to provide inaccurate data, causing the associated control system to adjust the air fuel ratio erroneously.

SUMMARY OF THE INVENTION

One aspect of the present invention includes the realization that diagnosis of a combustion condition sensor can be performed by monitoring certain operational parameters of the sensor. For example, the maximum and minimum voltage outputs of the sensor as well as the time elapsed during a transition between a maximum and minimum voltage output of the sensor can be used as an indication of the operational status of the sensor. Thus, by tracking such operational parameters of a combustion condition sensor, failure of the sensor can be diagnosed.

Accordingly, another aspect of the present invention includes a diagnostic system for an engine which includes a combustion condition sensor. The system comprises a controller which samples output from the combustion condition sensor and stores the output as a first output value. Subsequently, output from the combustion condition sensor is sampled to determine a second output value. The second output value is compared to the first output value in order to diagnose the combustion condition sensor.

Preferably, the combustion condition sensor is in the form of an oxygen sensor. In one mode, the first output value is a maximum voltage output from the oxygen sensor, which corresponds to the output of the oxygen sensor when the combustion of a "rich" air/fuel charge is sensed. The second output value also corresponds to the detection of rich air/fuel combustion. The second value is compared with the first value to determine if the second value is higher than the first value. If the second value is higher than the first value, the second value is stored as the maximum output value of the oxygen sensor. Thus, the stored maximum output voltage of the oxygen sensor can then be used for diagnostic purposes of the oxygen sensor.

For example, a technician can read the stored maximum output value of the oxygen sensor and determine if the maximum output voltage is within a range corresponding to the proper operation of the oxygen sensor. If the maximum output voltage is outside the range corresponding to proper operation, the technician can then conclude that the oxygen sensor is malfunctioning and thus must be repaired or replaced.

In another mode, the first output value is a minimum output value of the oxygen sensor and the second output value is a subsequent minimum output value of the oxygen sensor. In a similar fashion, the controller stores the minimum output value of the oxygen sensor to determine if the oxygen sensor is operating properly.

In yet another mode, the controller can be configured to detect the transition of the sensor from a maximum voltage output to a minimum voltage output. This condition is caused, for example, when the air fuel charges combusted in the combustion chamber change from rich to lean mixtures, or from lean to rich mixtures. In this mode, the controller is configured to determine the time interval over which the oxygen sensor switches from the maximum output voltage to the minimum output voltage. The controller then stores this value as a transition time period. A technician can then compare the stored transition time period with a range of values that corresponds to the proper operation of the oxygen sensor. If the transition time period falls outside of the range, the technician can use this information to conclude whether the oxygen sensor might need repair or replacement.

The above-mentioned modifications are intended to be within the scope of the invention herein disclosed. These and other modifications of the present invention will become readily apparent to those skilled in the art from the following detailed description of the preferred embodiment having referenced to the attached figures, the invention not being limited to any particular preferred embodiment enclosed.

BRIEF DESCRIPTION OF THE DRAWINGS

These and other features of the invention will now be described with reference to the drawings of the preferred embodiment, which is intended to illustrate and not to limit the invention. The drawings contain the following figures.

DETAILED DESCRIPTION OF THE PREFERRED EMBODIMENTS OF THE INVENTION

With initial reference to FIG. 1, an outboard motor 10 with an engine diagnostic system having certain features, aspects and advantages of the present invention will be described. The engine diagnostic system is described in conjunction with an outboard motor to provide an environment in which the invention may be employed. Although the present invention has particular applicability to an outboard motor, it is anticipated that the engine diagnostic system can have utility in other environments of use. For example, the present invention can be used in any internal combustion engine which is serviced at least once during its life span. Such applications might include, for example, without limitation, engines for personal watercraft, small jet boats, off-road vehicles, and/or automobiles.

Figure 1:
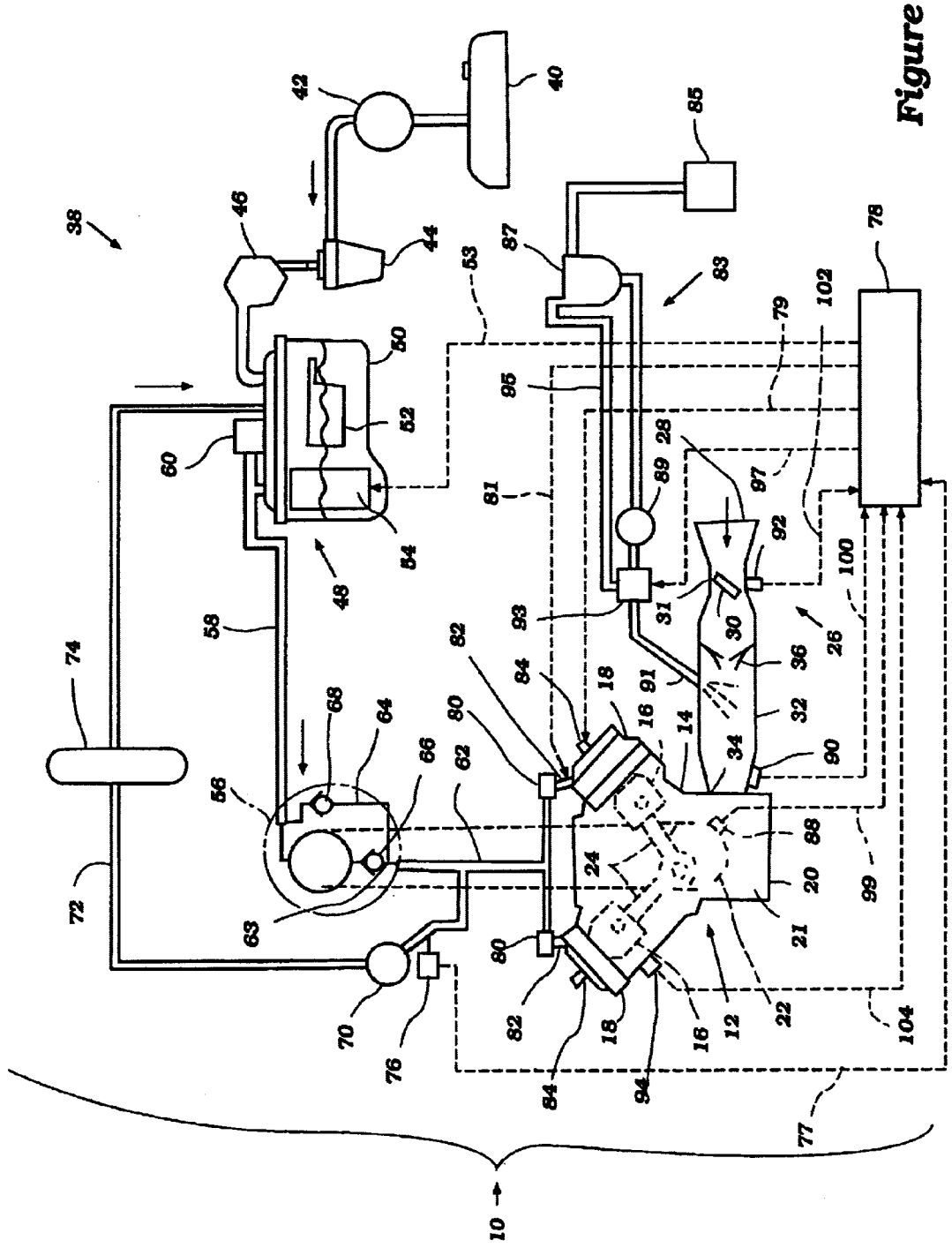
FIG. 1 is a schematic view of an engine of an outboard motor having certain features and advantages according to the present invention. The lower portion of this view shows a top plan view of the engine. The upper portion of this view schematically shows the fuel supply system of the outboard motor. Both the engine and the fuel supply system are connected to an ECU, which is depicted in the lower right-hand portion of the view.

As shown in FIG. 1, the outboard motor 10 includes an engine 12. The illustrated engine operates on a two-cycle combustion principal. The engine 12 has cylinder block 14 that, in the illustrated embodiment, defines six cylinder bores (not shown). A corresponding number of pistons 16 are slidably supported in the cylinder bores for reciprocal movement.

The illustrated engine block 14 defines two cylinder banks each of which have three cylinder bores. The cylinder banks are disposed at an angle to each other. As such, the illustrated engine 12 is a two-cycle, V6-type engine (i.e., "2-stroke V-6"). However, it should be appreciated that the present invention can be practiced utilizing an engine with any number of cylinders having other configurations (e.g., W, in-line, or opposed), and/or operating under different principles of operation (e.g., four-cycle, rotary or diesel principles).

In the illustrated arrangement, a pair of cylinder head assemblies 18 are affixed to one end of the cylinder block 14 to close the cylinder bores. The cylinder head assemblies 18, the cylinder bores, and the pistons 16 form the combustion chambers of the engine 12. The other end of the cylinder block 14 is closed with a crankcase member 20, which defines a crankcase chamber 21.

The crankshaft 22 rotates in the crankcase chamber 21. The crankshaft 22 is connected to the pistons 16 by connecting rods 24 and rotates with reciprocal movements of the pistons 26. As is typical with two-cycle crankcase compression engines, the portions of the crankcase chamber 21 associated with each of the cylinder bores are sealed from each other.

The crankshaft 22 is also coupled to a driveshaft (not shown) that depends into and is journaled within a driveshaft housing lower unit assembly (not shown) of the outboard motor 10. As is typical in outboard motors, the illustrated engine 12 is arranged such that the crankshaft 22 and the driveshaft rotate about a vertically extending axis. The driveshaft drives a propulsion device (not shown) such as a propeller or jet pump, through a suitable transmission. The transmission device is selectively driven in forward and reverse directions through a beveled gear reversing transmission (not shown). Since these components are well-known in the art, a further description of such is not necessary to permit those skilled in the art to practice the invention.

An air induction system, generally indicated by the referenced numeral 26, supplies air to the crankcase chamber 21. The illustrated induction system 26 includes an air inlet device 28 that can include a silencer (not shown). The air inlet device draws air from within a protective cowling (not shown) that surrounds and protects the engine 12. The protective cowling includes an inlet opening so that air can be drawn in from the surrounding atmosphere.

A throttle body 31 connects the intake device 28 with each of the individual chambers defined within the crankcase chamber 21. A throttle valve 30 is provided in each of the throttle bodies 31. The throttle bodies 31 deliver air to intake manifold runner 32 of an intake manifold assembly. The throttle valves 30 are controlled in any suitable manner. Each intake manifold runner 32 is associated with a respective cylinder bore and communicates with intake ports 34 formed in a crankcase member 20.

Preferably, a reed-type check valve 36 is provided in the manifold runner 32 upstream of the intake port 34. Each reed-type check valve permits an air charge to be drawn into the crankcase chamber 21 when the respective piston 16 moves upwardly in the cylinder bore. As the respective piston 16 moves downwardly, the charge in the crankcase chamber 21 is compressed and the respective reed-type check valve 36 is closed to preclude reverse flow.

As is well-known in the art of two-cycle engines, each cylinder bore preferably is provided with a scavenging system such as a Schnurl-type scavenging system. Accordingly, the cylinder bore preferably includes a pair of side, main scavenge ports and a center, auxiliary scavenge port. Scavenge passages connect the crankcase chamber 21 with each of the scavenge ports. As is well-known in two-cycle practice, the scavenge ports are opened and closed by the reciprocations of the pistons 16 in the cylinder bores.

Preferably, the main scavenge ports are disposed on opposite sides of an exhaust port which is diametrically opposite the center auxiliary scavenge port. The exhaust ports 36 communicate with the exhaust manifolds (not shown) that are formed integrally with the cylinder block 14. The exhaust manifolds terminate at exhaust pipes (not shown) that depend into an expansion chamber (not shown) formed in the driveshaft housing and lower unit. The expansion chamber communicates with a suitable high speed underwater exhaust gas discharge and a low speed above the water exhaust gas discharge of any known type.

The illustrated engine 12 includes a fuel injection system 38 which is illustrated partially schematically in the upper right-hand portion FIG. 1 and is connected to the illustration of the engine in the lower left-hand corner of FIG. 1. The illustrated fuel injection system 38 is a direct fuel injection system. That is, as is explained in more detail below, the illustrated fuel injection system 38 is configured to inject fuel directly into the combustion chambers. It should be appreciated, however, the present invention can be achieved in an engine utilizing any type of fuel injection system including, for example, but without limitation, an indirect fuel injection system (i.e., a fuel injection system configured to inject fuel into the induction system 26).

As is typical with outboard motor practice, the outboard motor 10 is supplied with fuel from a main fuel tank 40 which is normally located within the hull of the associated watercraft. A hand pump 42 primes a low pressure fuel pump 46 with the fuel from the main fuel tank 40. A fuel filter 44 is preferably mounted between the hand pump 42 and the low pressure fuel pump 46 and preferably is located within the protective cowling of the outboard motor 10.

In the illustrated arrangement, the low pressure fuel pump 46 is located within the protective cowling and collects the fuel from the fuel filter 44 and delivers it to a vapor separator, which is indicated generally by the reference numeral 46. It should be appreciated that the low pressure fuel pump 48 may be of the type that is operated by crankcase pressure variations. These types of pumps are well-known in the art. It should also be appreciated that the outboard motor 10 can have more than one low pressure pump.

The illustrated vapor separator 48 includes an outer housing 50 and is mounted at a suitable location within the protective cowling. A valve (not shown) is operated by a float 52 and maintains a desired level of fuel within the vapor separator 48. Contained within the housing 50 is an electrically driven pump 54 that develops a higher fuel pressure than the low pressure fuel pump 48. The electrically driven pump 54 supplies fuel to a high pressure pump 56, which is preferably a positive displacement, engine driven pump, through supply conduit 58. The high pressure pump 56 may be of any known type, but preferably has one or more plungers (not shown) operated by cams (not shown) for raising fuel to a pressure sufficient for direct injection. A low pressure regulator 60 regulates the pressure at which fuel is delivered to the high pressure pump 56.

The high pressure pump 56 delivers high pressure fuel to a main fuel manifold 62 through a first conduit 63 and a second conduit 64. The first conduit 63 includes a check valve 66. The second conduit 64 runs parallel to the first conduit 63 and also includes a check valve 68. The check valve 68 in the second conduit 64 prevents high pressure fuel from flowing upstream through the conduit 64.

A high pressure regulator 70 is connected to the main fuel manifold 62. The regulator 70 limits the maximum pressure of the fuel supply by returning fuel back to the vapor separator 48 through a return line 72. A fuel heat exchanger or cooler 74 can be provided in the return line 72 to cool the fuel before it is returned to the vapor separator 48. A fuel pressure sensor 76 is also connected to the main fuel manifold 62. The fuel pressure sensor 76 provides a signal indicative of the fuel pressure through a sensor line 77 to an electronic control unit 78 (the "ECU"). The ECU 78 controls the engine systems and aids engine diagnostics, as is described in more detail below.

The main fuel manifold 62 supplies fuel to a pair of fuel rails 80, which are each associated with one of the cylinder banks. The fuel rails 80 supply fuel to the fuel injectors 82. In the illustrated arrangement, the fuel injectors 82 are mounted in each of the cylinder head assemblies 18; however, they can alternatively be mounted to the cylinder block 14 in order to inject fuel indirectly. Preferably, the fuel injectors 82 are mounted above the exhaust ports on the exhaust side of the engine 12. The fuel injectors 82 spray fuel into the combustion chambers of the engine. The fuel injectors 82 are preferably of the solenoid operated type and have solenoid valves (not shown) which, when operated, control the discharge of fuel into the combustion chambers. The ECU 78 controls the opening and closing of the solenoid valves via a control line 81. The ECU 78 also controls the electronic pump 54 in the vapor separator 48 through control line 53.

Spark plugs 84 are mounted in the cylinder head assemblies 18 and have their spark gaps disposed substantially on the axis of the cylinder bores. The spark plugs 84 are fired by an ignition circuit 86, which is controlled by the ECU 78 through a control line 79.

In addition to controlling timing of the firing of the spark plugs 84 and initiation and duration of fuel injection by the fuel injectors 82, the ECU 78 preferably also controls a lubrication system 83. The lubrication system 83 includes a first lubricant reservoir 85, which can be located within the watercraft. The lubrication system 83 also includes a second lubricant reservoir 87, which is preferably located within the protective cowling of the outboard motor 10.

To lubricate the engine 12, a lubrication pump 89 draws lubricant from the second reservoir 87 and sprays lubricant through a lubricant supply pipe 91 into the intake manifold runner 32. An electromagnetic solenoid valve 93, which is preferably controlled by the ECU 78, regulates the amount of lubricant that is supplied to the manifold runner 32. The ECU 78 controls the valve 93 through the control line 97. Excess lubricant is returned to the second reservoir 87 via a return pipe 95. Those of skill in the art will recognize that the outboard motor 10 can also include forms of direct lubrication for delivering lubricant directly to certain components of the engine.

The outboard motor 10 also includes various sensors which sense engine running conditions, ambient conditions, and/or conditions of the outboard motor 10. As is well-known in the art, an engine control system can utilize maps and/or indices stored within the memory of the ECU 78 with reference to the data collected from these various sensors to control the engine 10. Various sensor can also be used to diagnose problems with the outboard motor. Some of the more important sensors for engine control and engine diagnostics are shown schematically in FIG. 1. It should be appreciated, however, that it is practicable to provide other sensors, such as, for example, a crankcase pressure sensor, an engine temperature sensor, a trim angle sensor, a knock sensor, a neutral sensor, a water craft pitch sensor, a shift position sensor, and an atmospheric temperature sensor that can be used in accordance with various control or the diagnostic strategies described below.

With reference to FIG. 1, a crank angle sensor 88 is associated with the crankshaft 22. The crankshaft angle sensor 88 defines a pulse generator that produces pulses as the crankshaft 22 rotates. The pulses are sent to the ECU 78 via sensor line 99 and indicates the rotational position of the crankshaft 22, or the "crank angle". The pulses can also be converted to an engine speed within the ECU 78 or another separate converter (not shown) by measuring crankshaft angle versus time.

There is also provided an intake air temperature sensor 90 that senses the air temperature in the intake manifold 32. A throttle position 92 sensor is positioned and configured to detect a position of the throttle valve 30. Accordingly, the engine or operator demand can be determined. The air temperature sensor 90 and the throttle position sensor 92 are connected to the ECU by sensor lines 100 and 102 respectively.

The outboard motor also preferably includes a combustion condition sensor. Preferably, the combustion condition sensor is in the form of an air/fuel ratio sensor 94 that is connected to the ECU 78 by a sensor line 104. The air/fuel ratio sensor 94 communicates with the combustion chambers or exhaust port of at least one of the cylinders. Preferably, the air/fuel ratio sensor 94 can be in the form of an oxygen sensor; however, other types of sensors may be employed.

Figure 2:
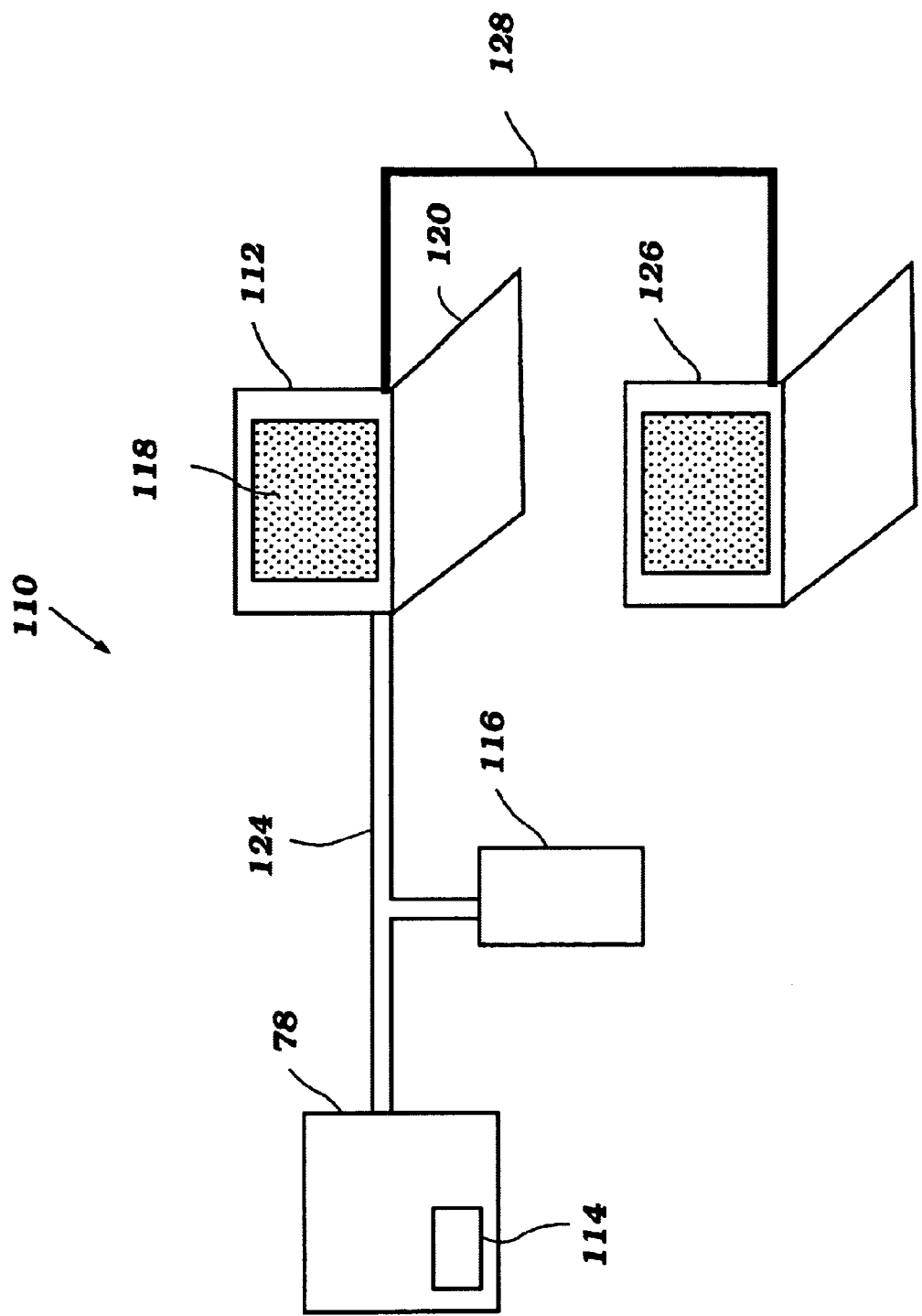
FIG. 2 is a schematic view of the diagnostic system for the outboard motor of FIG. 1. The diagnostic system includes the ECU of FIG. 1 and a computer.

With reference to FIGS. 2–6, the outboard motor 10 includes a diagnostic system 110. As shown in FIG. 2, the illustrated diagnostic system 110 preferably includes the ECU 78 and a computer 112. The ECU 78, as described above, is connected to various engine sensors such as, for example, the air/fuel ratio sensor 94 and the crank angle position sensors 88. The ECU 78 preferably includes a data storage device 114 which can be constructed in any known manner. Preferably, the storage device 114 is an EEPROM-type memory device incorporated into the ECU 78. Alternatively, the memory device 114 can be constructed as a separate component.

The diagnostic system also preferably includes a voltage conversion adapter 116. Voltage conversion adapters are well-known in the art and are used to convert a signal from the ECU 78 into a form readable by a computer such as the computer 112. For example, the voltage adapter 116 can be used to convert a 12 volt signal, which is common in outboard motors, to a 5 volt signal. Although the illustrated voltage conversion adapter 116 is illustrated as being separate from the ECU 78, it should be appreciated that the adapter 116 can also be integrated into the ECU 78 or the computer 112.

The computer 112 is preferably a personal computer with a CPU supporting industry standard architecture. The computer includes a video display monitor 118 for displaying data and an input device 120 such as a keyboard for inputting data. The computer 112 is connected to the ECU 78 and the voltage conversion adapter 116 by a standard communication cable 124. The computer 112 is also preferably connected to a second computer 126 by communication cable 128 50 that a more experienced technician or engineer can also access data that has been retrieved and/or stored on the computer 112.

The diagnostic system preferably includes at least one routine configured to collect and/or store data from the various engine sensors. Examples of suitable routines are provided in U.S. patent application Ser. No. 09/579,908 filed on May 26, 2000, and is hereby expressly incorporated by reference. It should be noted that the ECU 78 which performs the routines, may be in the form of a hard-wired feedback control circuit that performs the routines described below. Alternatively, the ECU 78 can be constructed of a dedicated processor and memory for storing a computer program configured to perform the routines. Additionally, the ECU can be a general purpose computer having a general purpose processor and memory for storing a computer program for performing the steps and functions described below.

In order to diagnose an engine, such as the engine 12, a technician or an engineer can connect a personal computer, such as the personal computer 112, to the ECU 78 through the voltage conversion adapter 116. The technician or engineer can then use the computer 112 to retrieve (i.e., communicate and upload) and display operational data that had been collected by the ECU 78 and/or stored within the storage drives 114. More specifically, the computer 112 includes an interactive computer program that is stored in the memory of the computer 112. The computer program can be configured to retrieve data periodically or to retrieve data when an option menu is chosen. Alternatively, the computer program can retrieve data in a large batch and store the retrieved data in the memory of the computer 112. Preferably, the computer program also allows the technical or engineer to view the retrieved data with a menu type format, such as the one illustrated schematically in FIGS. 3–5.

Figure 3:
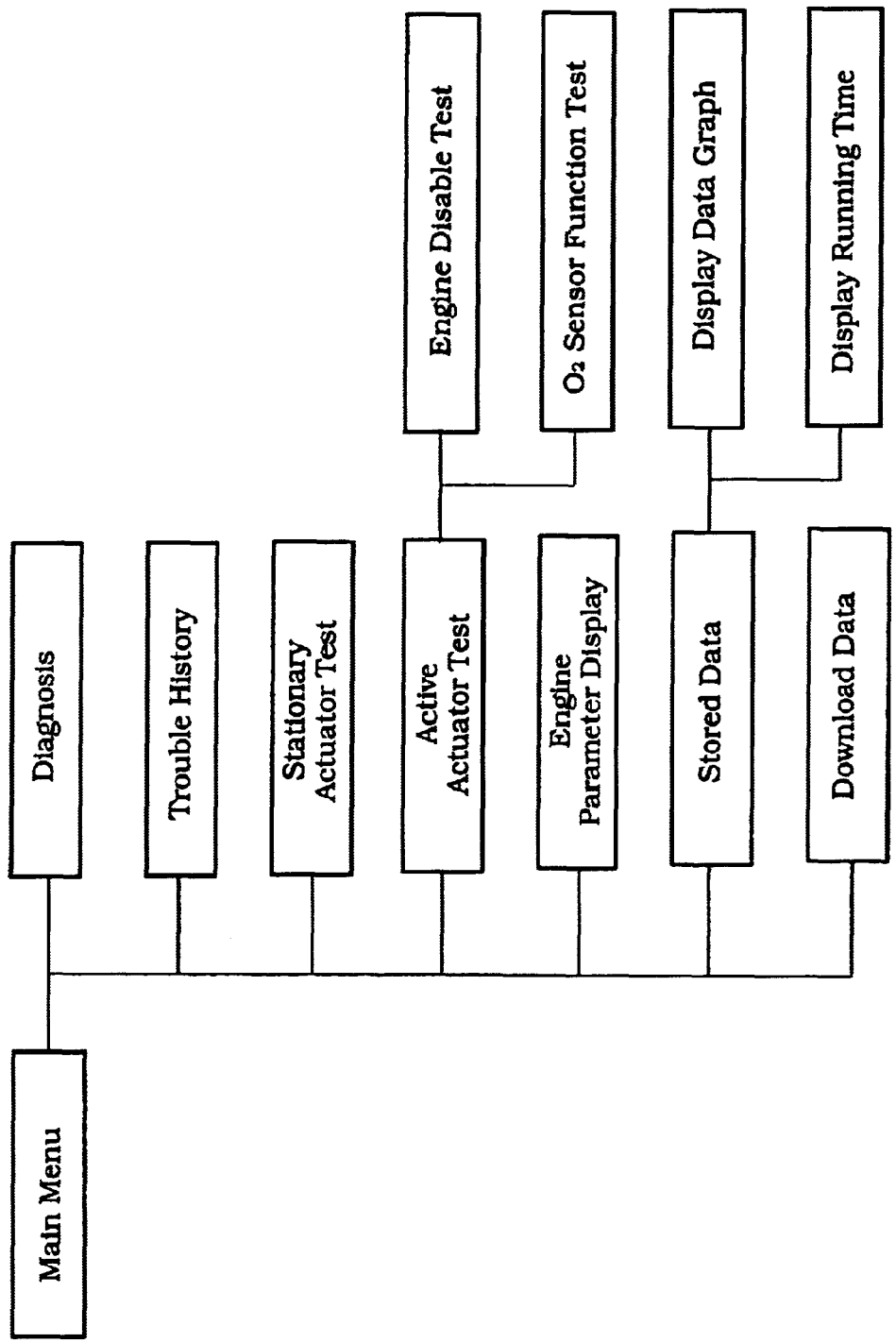
FIG. 3 is a schematic representation of menu options that can be displayed on a display screen of the computer shown in FIG. 2.

Accordingly, as indicated by FIG. 3, the computer 112 preferably offers the technician or engineer a menu of data choices such as, for example, but without limitation "diagnosis," "trouble history," "stationary actuator test," "active actuator test," "engine parameter display," "stored data," and "download data."

Of these menu options "diagnosis," "trouble history," "stationary actuator test," "engine parameter display," and "download data" are described in detail in the above-referenced U.S. patent application Ser. No. 09/579,908. Because the operation of these options are not part of the present invention, their operation will not be described further.

Figure 4:
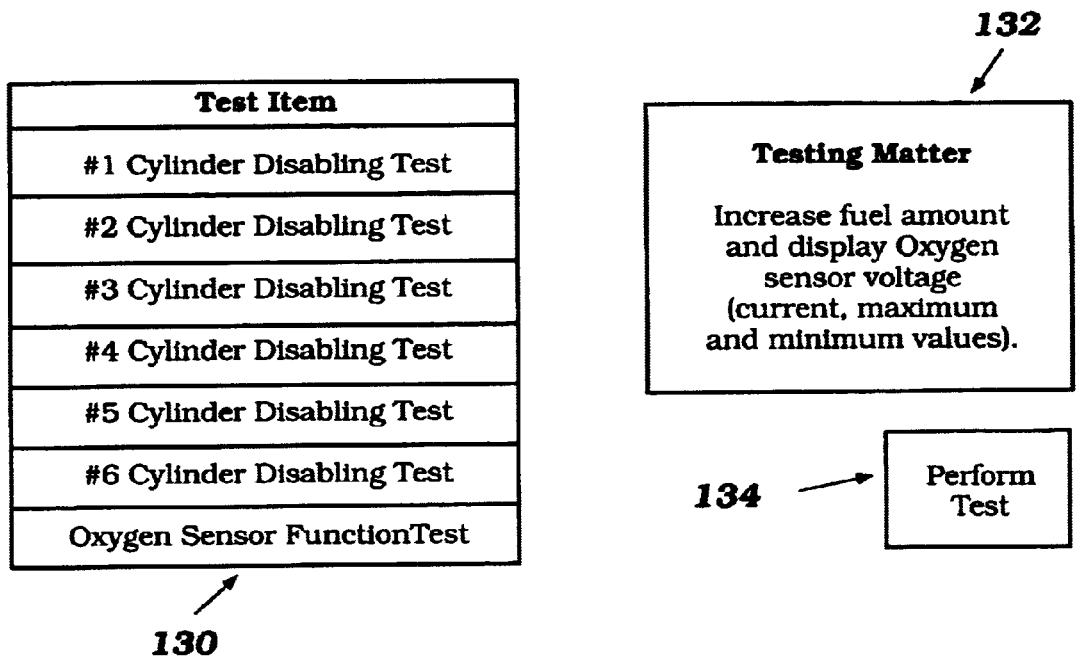
FIG. 4 is a schematic representation of a graphical user interface that can be displayed on the computer illustrated in FIG. 2.

With reference to FIG. 4, the graphical user interface screen corresponding to the "active actuator test" option is illustrated therein. As shown in FIG. 4, the menu corresponding to the "active actuator test" includes a first portion 130 which includes seven options corresponding to seven different tests. Six of the tests correspond to cylinder disabling tests and a seventh test corresponds to an oxygen sensor function test.

Figure 5:
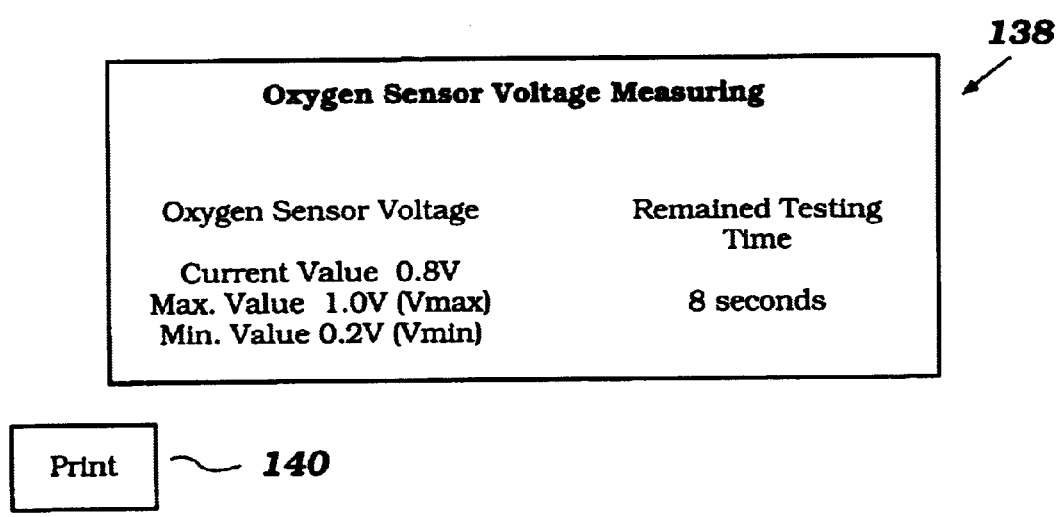
FIG. 5 is a further graphical user interface that can be displayed on the computer illustrated in FIG. 2.

The menu also includes a second viewing area 132 for displaying information regarding a particular test selected. Additionally, the menu illustrated in FIG. 4 includes a start button 134. In operation, a user can select at least one of the test items illustrated in the viewing area 130. Once the desired test or tests is selected, information regarding the selected test or tests is displayed in the viewing area 132. To begin the test selected, the button 134 can be activated which will cause the computer 112 to initiate the selected test. FIG. 5 illustrates an example of test data displayed while the computer 112 performs an oxygen sensor function test.

Figure 6:
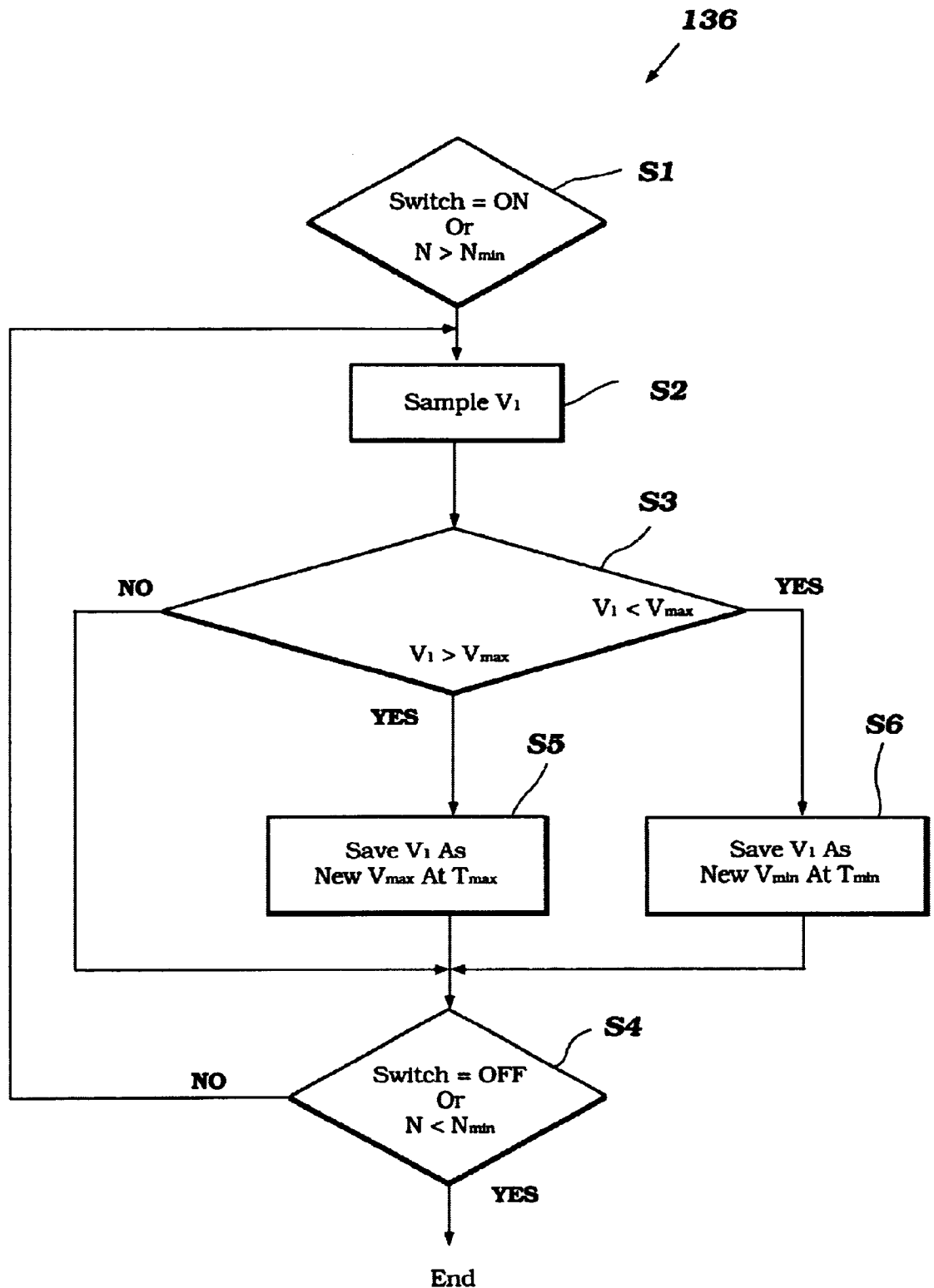
FIG. 6 is a flow diagram of a routine that can be used with the ECU of FIG. 1.

With reference to FIG. 6, a routine 136 which can be used as an oxygen sensor function test is illustrated therein. The routine 136 begins at a step S1. For example, the routine 136 can begin when the main switch of the outboard motor 10 is moved to the "on" position or when the engine speed (N) of the engine 12 is greater than a minimum predetermined engine speed ($N_{MIN}$) If the main switch is turned on or the engine speed N is greater than the minimum engine speed $N_{MIN}$, the routine 136 moves on to a step S2.

At the step S2, an output value of a combustion condition sensor within the engine 12 is sampled. For example, the ECU 78 can sample the output voltage $V_1$ of the oxygen sensor 94. After the step S2, the routine 136 moves on to a step S3.

At the step S3, the output value $V_1$ is compared to predetermined minimum and maximum output values $V_{MIN}$, $V_{MAX}$, respectively. The minimum output value $V_{MIN}$ corresponds to a predetermined minimum output value of the combustion condition sensor. For example, the minimum output value $V_{MIN}$ can be the minimum voltage previously output from the oxygen sensor 94. Similarly, the maximum output value $V_{MAX}$ can be a maximum output voltage of the oxygen sensor 94. In the step S3, the sampled output value $V_1$ of the oxygen sensor 94, is compared to the minimum and maximum predetermined values $V_{MIN}$, $V_{MAX}$, and is determined whether the sampled value $V_1$ is greater than the predetermined maximum $V_{MAX}$ or less than the predetermined minimum $V_{MIN}$. In the step S3, if it is determined that the sampled output value $V_1$ is not greater than the predetermined maximum value $V_{MAX}$ and is not less than the predetermined minimum output value $V_{MIN}$, the routine 136 moves on to a step S4.

At the step S4, it is determined whether the main switch has been turned "off" or if the engine speed N is less than the minimum predetermined engine speed $N_{MIN}$. In the step S4, if it is determined that the main switch is off and/or if the engine speed N is less than the predetermined minimum engine speed $N_{MIN}$, the routine 136 ends. If, however, it is determined that the main switch has not been turned off and that the engine speed N is not less than the minimum predetermined engine speed $N_{MIN}$, the routine 136 returns to the step S2 and repeats.

Referring again to the step S3, if it is determined that the sampled output value $V_1$ is greater than the predetermined maximum value $V_{MAX}$, the routine 136 moves on to a step S5.

At the step S5, the sampled voltage $V_1$ is stored as a new maximum output value $V_{MAX}$. For example, the ECU 78 can store the sampled output value $V_1$ in the memory device 114.

In the illustrated embodiment, the oxygen sensor 94 emits output values in the form of voltages. Thus, the ECU 78 stores the output value $V_1$ as a voltage. After the step S5, the routine 136 moves on to the step S4 and repeats as described above with respect to the step S4.

If, however, in the step S3, it is determined that the sampled output value $V_1$ is less than the predetermined minimum output value $V_{MIN}$, the routine 136 moves on to a step S6.

In the step S6, the sampled output value $V_1$ is stored as a new minimum output value $V_{MIN}$ of the oxygen sensor 94. As noted above with respect to the step S5, the ECU 78 can store the new minimum output value $V_{MIN}$ in the memory device 114. After the step S6, the routine 136 returns to the step S4 and repeats as noted above.

Optionally, the time at which the sampled output value $V_1$ exceeds the predetermined minimum or maximum predetermined output values $V_{MIN}$, $V_{MAX}$ can be stored along with the new minimum and maximum values $V_{MIN}$, $V_{MAX}$. For example, in the step S5, the ECU 78 can store the output value $V_1$ as the new maximum output value $V_{MAX}$, as well as a time $T_{MAX}$ at which the output value $V_1$ was sampled in the step S2. Similarly, in the step S6, the ECU 78 can store the value $V_1$ as the new minimum output value $V_{MIN}$ along with a time $T_{MIN}$ at which the output value $V_1$ was sampled in the step S2.

By configuring the control routine 136 to store the maximum and minimum output values of a combustion condition sensor such as the oxygen sensor 94, the routine 136 can be used to diagnose the oxygen sensor 94. For example, the ECU 78 can be configured to perform the routine 136 at all time during operation, with the stored data being saved to the memory device 114. Alternatively, a technician or an engineer can connect the computer 112 to the ECU 78 with the communication line 124 and run the routine 136 to determine the maximum and minimum output values of the oxygen sensor 94. The technician or engineer can select the oxygen sensor function test in the display portion 130 illustrated in FIG. 4 and activate the button 134 to begin the oxygen sensor function test. As the oxygen sensor function test is performed, the output values monitored can be displayed on the display 118 of the computer 112 as illustrated in FIG. 5. In particular, as shown in FIG. 5, the routine 136 can also be configured to generate a display portion 138 displaying a current value of the voltage output of the oxygen sensor 94, as well as the presently stored maximum and minimum values $V_{MAX}$, $V_{MIN}$. Additionally, a print button 140 can be generated on the display 118 so that the engineer or technician can print the values displayed in the display portion 138.

Using the output values determined during the routine 136, an engineer or technician can compare the maximum and minimum values $V_{MAX}$, $V_{MIN}$ with predetermined values corresponding to properly operating oxygen sensors. Thus, the engineer or technician can determine if the oxygen sensor 94 is operating properly. However, if the technician or engineer determines that the maximum and/or minimum output values $V_{MAX}$, $V_{MIN}$ of the oxygen sensor 94 is outside the range corresponding to a properly operating oxygen sensor, the engineer or technician can determine that the oxygen sensor 94 needs repair or replacement.

Additionally, by configuring the routine 136 to store a time at which the maximum and minimum values $V_{MAX}$, $V_{MIN}$ occurred, the engineer or technician can use such information to further diagnose problems associated with the oxygen sensor 94.

Figure 7:
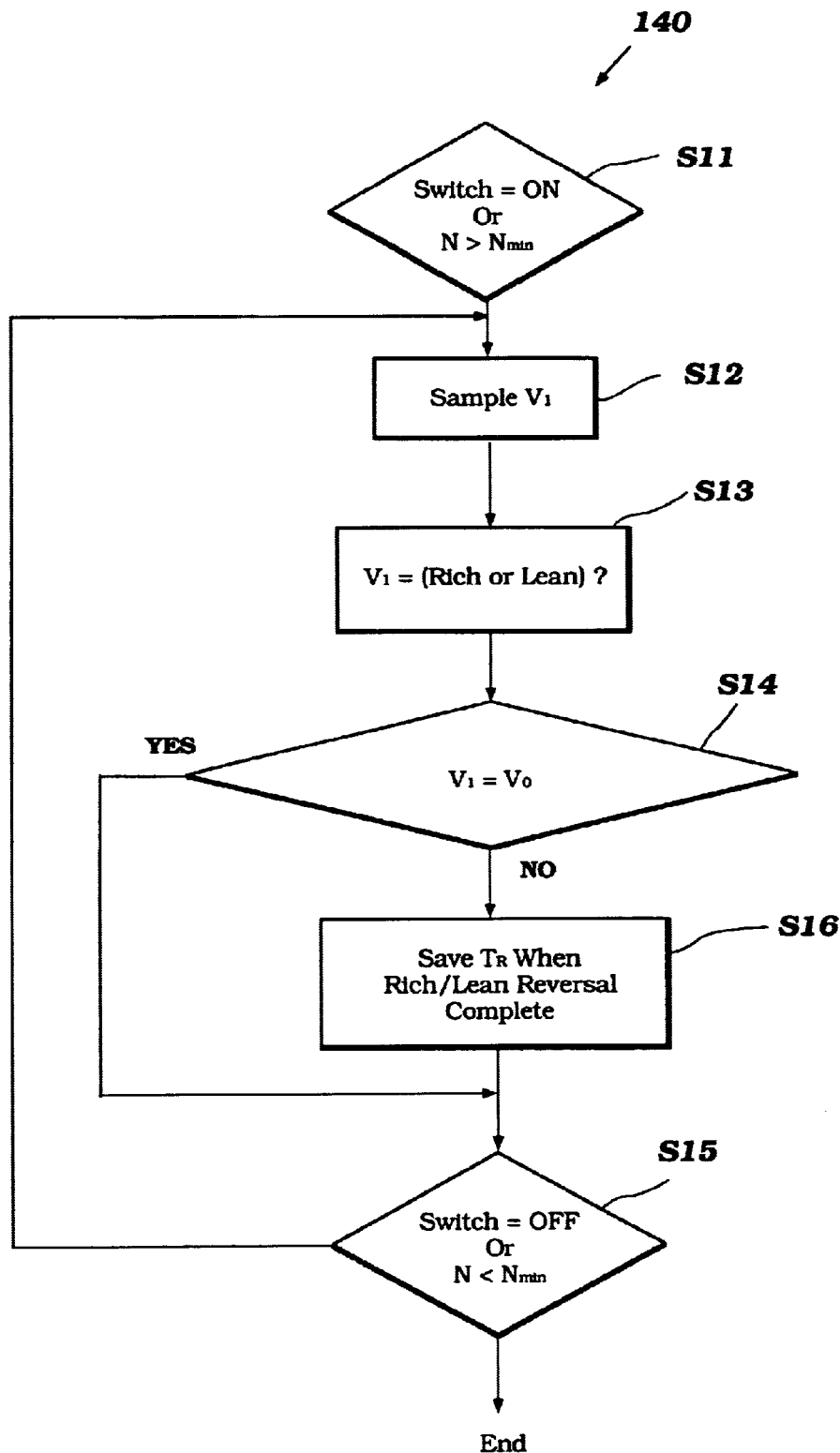
FIG. 7 is a modification of the routine illustrated in FIG. 6.

With reference to FIG. 7, a routine 140, which is a modification of the oxygen sensor function test routine 136 illustrated in FIG. 6, is illustrated therein. The routine 140 begins at a step S11. The step S11 can be performed in accordance with the description of the step S1 illustrated in FIG. 6. Thus, the routine 140 begins when the main switch is turned "on" or when the engine speed N is greater than the minimum engine speed $N_{MIN}$. After the step S11, the routine 140 moves on to a step S12.

At the step S12, an output value of a combustion condition sensor is determined. For example, the ECU 78 can sample the output voltage $V_1$ of the oxygen sensor 94. After the step S12, the routine 140 moves on to a step S13.

At the step S13, it is determined whether the output value $V_1$ corresponds to a "rich" or "lean" combustion condition within the corresponding combustion chamber within the engine 12. For example, the output value $V_1$ can be compared to known output values from the oxygen sensor 94 that correspond to the combustion of rich and lean mixtures within the combustion chamber. Thus, if the output value $V_1$ is high, the air fuel charge combusted within the combustion chamber was rich in fuel. If, however, the output value $V_1$ is low, then the air fuel charge combusted in the combustion chamber was lean. After the step S13, the routine 140 moves on to the step S14.

At the step S14, the sampled output value $V_1$ is compared to a previously sampled output value $V_0$ from the oxygen sensor 94. If the output value $V_1$ is the same as the previously sampled output value $V_0$, the routine 140 moves onto a step S15.

At the step S15, similarly to the step $S_4$ described above with reference to FIG. 6, the routine 140 either ends or returns to the step S12 depending on whether the main switch is turned off or if the engine speed N is below a minimum engine speed $N_{MIN}$.

If, however, in the step S14, the sampled output value $V_1$ is not the same as the previously sampled output value $V_0$, the routine 140 moves on to a step S16. At the step S16, it is determined whether the output of the oxygen sensor has reversed between a rich and lean condition. For example, as the engine 12 operates, the ECU 78 controls aspects of fuel injection depending on the output of the oxygen sensor 94 in order to substantially maintain the predetermined desired air fuel ratio. Thus, when the ECU 78 receives output signals from the oxygen sensor 94 that a mixture combusted in the combustion chamber was rich, the ECU 78 decreases the amount of fuel delivered thereto in order to adjust the air towards a lean mixture. After the ECU has reduced the amount of fuel delivered to the combustion chamber sufficiently, the output of the sensor reverses and therefore outputs a low voltage, indicating the combustion of a lean mixture.

Conventional oxygen sensors are constructed so as to produce only two outputs, i.e., high voltage corresponding to rich air fuel mixtures and low voltage outputs corresponding to lean air fuel mixtures. The reversal or switching between high and low voltage occurs over a relatively short period of time. Thus, in the step S16, the time $T_R$ over which the voltage output from the oxygen sensor 94 reverses from high to low or from low to high is saved to the memory device 114 in the ECU 78. If, however, the present time $T_R$ is the same as a previously determined $T_R$, then the new $T_R$ is not saved. After the step S16, the routine 140 returns to the step S15 and repeats as discussed above.

By configuring the routine 140 to track the time required for the output signal of the oxygen sensor 94 to reverse from high to low or from low to high, an engineer or technician can access the time period $T_R$ and compare this time period $T_R$ with an acceptable range which corresponds to a properly operating oxygen sensor. If the time period $T_R$ falls outside the acceptable range, a technician or engineer may conclude that repair or replacement of the oxygen sensor 94 is required.

Figure 8:
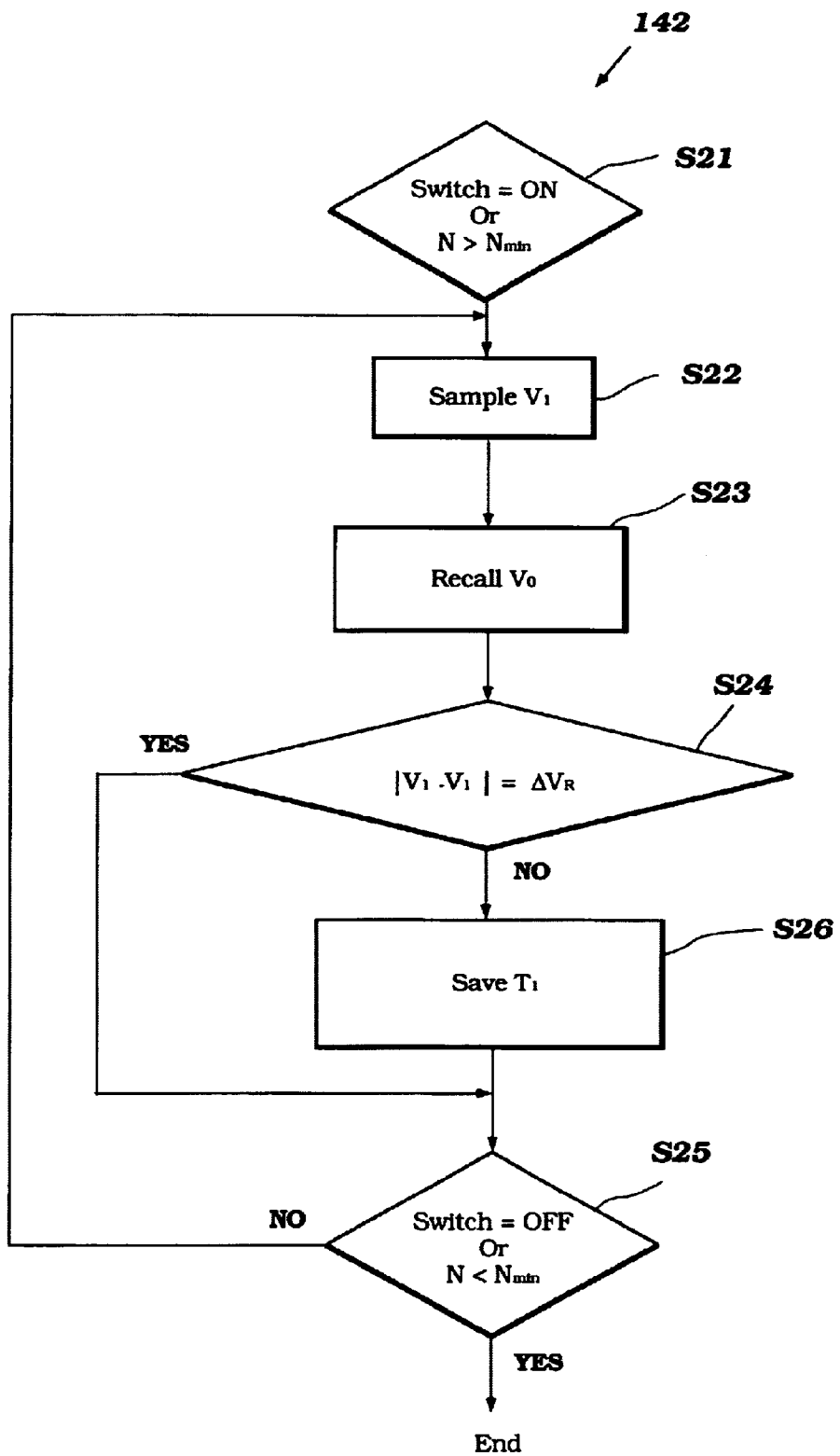
FIG. 8 is a further modification of the routine illustrated in FIG. 6.

With reference to FIG. 8, a further modification of the routine 136 is illustrated therein and is identified generally by the reference numeral 142. Similarly to the routines 136 and 140, the routine 142 begins at a step S21. In the step S21, it is determined whether the main switch is on or if the engine speed N is above a minimum engine speed $N_{MIN}$. If it is determined that either or both of these conditions are met, the routine 142 moves on to a step S22.

In the step S22, an output value $V_1$ of a combustion condition sensor, such as the oxygen sensor 94, is sampled. For example, the ECU 78 can sample the voltage output from the oxygen sensor 94 via the line 104. After the output value $V_1$ is sampled, the routine 142 moves on to a step S23.

In the step S23, a previously sampled output value $V_0$ is recalled. For example, the ECU 78 can retrieve a previously sampled output voltage of the oxygen sensor 94 from the memory device 114. After the previously sampled output value $V_0$ is recalled, the routine 142 moves on to a step S24.

In the step S24, it is determined whether, based on the output values $V_1$ and $V_0$, whether there has been a rich/lean reversal. For example, the ECU 78 can determine if the absolute value of the difference between $V_0$ and $V_1$ is the same as a predetermined voltage differential which corresponds to a rich/lean reversal of the oxygen sensor 94. It is to be recognized that the ECU 78 can be configured to determine whether the absolute value of the difference between $V_0$ and $V_1$ is greater than or equal to the predetermined voltage differential $\Delta V_R$. If it is determined that a rich/lean reversal has not occurred, the routine 142 moves on to a step S25.

In the step S25, it is determined whether the main switch is "off" or if the engine speed N is less than a minimum engine speed $N_{MIN}$ and either repeats or ends the routine 142 similarly to step S4 as described above with reference to FIG. 6.

If, however, in the step S24, it is determined that a rich/lean reversal has occurred, the routine 142 moves on to a step S26.

In the step S26, the time $T_1$ at which the output value $V_1$ was sampled as saved as corresponding to the occurrence of a rich/lean reversal. For example, the ECU 78 can save the time $T_1$ as corresponding to a rich/lean reversal in the memory device 114. After the time $T_1$ has been saved, the routine 142 moves on to the step S25 as noted above.

By configuring the routine 142 to save the time values corresponding to the rich/lean reversals, an engineer or technician can access the memory device 114 to determine the times when the ECU 78 has detected a rich/lean reversal.

Figure 9:
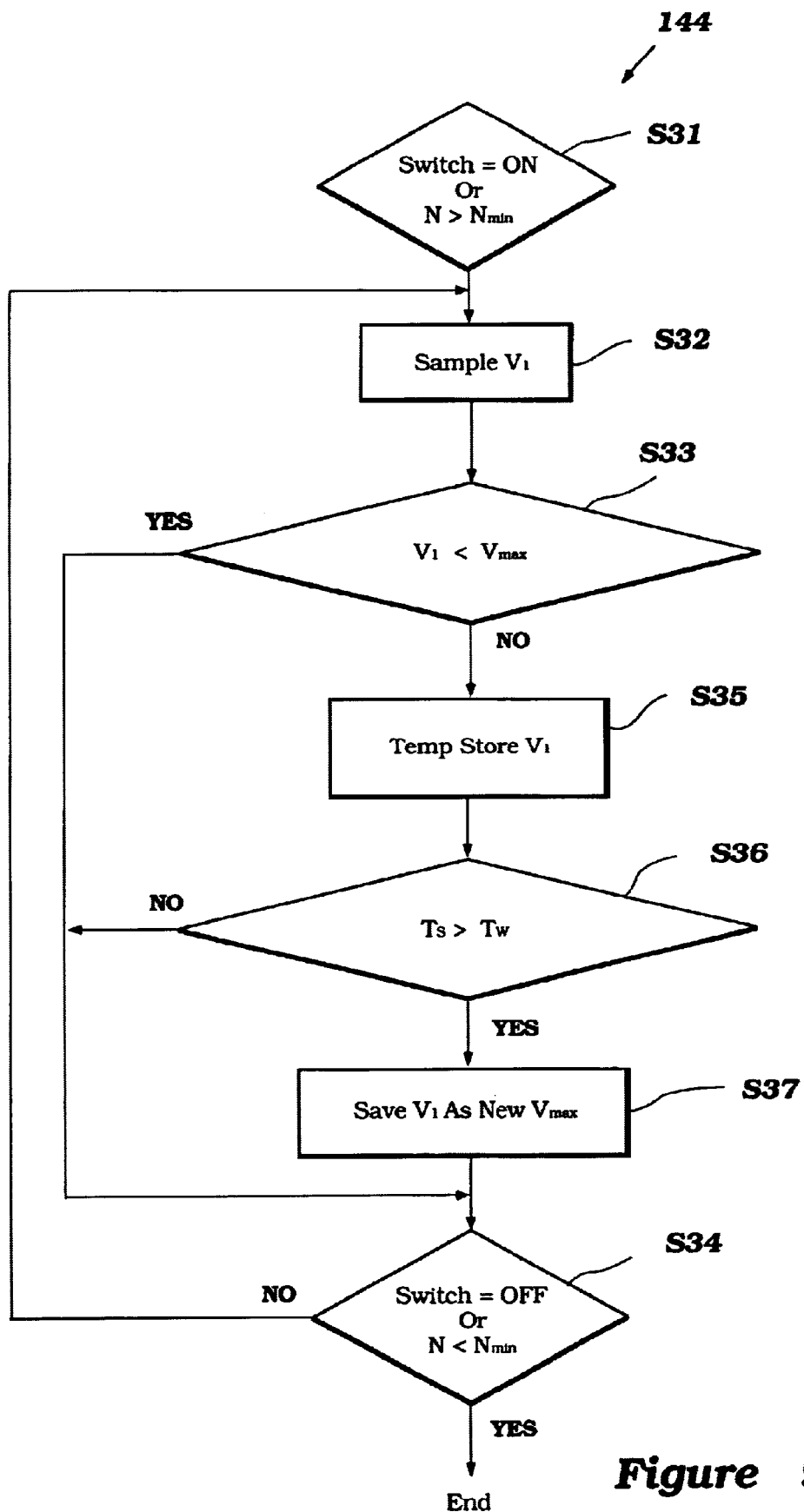
FIG. 9 is yet another modification of the routine illustrated in FIG. 6.

With reference to FIG. 9, a further modification of the routine 136 illustrated in FIG. 6, is illustrated therein, and is referred to generally by the reference numeral 144. The routine 144 begins with a step S31. At the step S31, it is determined whether a main switch is on and/or the engine speed N is greater than a minimum engine speed $N_{MIN}$. If either or both of the above conditions are met, the routine 144 moves on to a step S32.

At the step S32, an output value $V_1$ of a combustion condition sensor, such as the oxygen sensor 94, is determined. For example, the ECU 78 can sample an output voltage of the oxygen sensor 94 via communication line 104. After the output value $V_1$, has been sampled, the routine 144 moves on to a step S33.

At the step S33, the output value $V_1$ is compared to a previously stored maximum output value $V_{MAX}$. For example, the ECU 78 can compare the output voltage $V_1$ with a previously stored maximum output voltage $V_{MAX}$ of the oxygen sensor 94. If the output value $V_1$ is less than the previously stored maximum output value $V_{MAX}$, the routine 144 moves on to a step S34.

In the step S34, it is determined whether the main switch is off and/or the engine speed N is less than a minimum engine speed $N_{MIN}$, similar to the step S4 described above with reference to FIG. 6. If either of the above conditions are met, the routine 144 ends. If, however, the above conditions are not met, the routine 144 returns to the step S32 and repeats.

If, however, at step S33, it is determined that the output value $V_1$ is equal to or greater than the previously stored maximum output value $V_{MAX}$, the routine 144 moves on to a step S35.

At the step S35, the output value $V_1$ is temporarily stored. For example, the ECU 78 can temporarily store the output value $V_1$ in the memory device 114. After the step S35, the routine 144 moves on to a step S36.

In the step S36, it is determined whether the time elapsed from the engine starting and the time at which the output value $V_1$ was sampled, $T_S$ is greater than a predetermined warm-up time period $T_W$. If it is determined that the time period $T_S$ is not greater than the time period $T_W$, the routine 144 moves to the step S34 and either ends or repeats as noted above. If, however, it is determined that the time period $T_S$ is greater than the predetermined warm-up time period $T_W$, the routine 144 moves on to a step S37.

In the step S37, the output value $V_1$ is saved as a new maximum output value $V_{MAX}$. Optionally, the time $T_S$ can be saved along with the new maximum output value $V_{MAX}$. After the step S37, the routine 144 moves to the step S34 and either ends or repeats, as noted above.

By configuring the routine 144 to determine whether a predetermined warm-up time period $T_W$ has elapsed before saving an output value as a new maximum output value, the routine 144 helps to eliminate erroneous maximum output values from affecting the diagnosis of a combustion condition sensor. For example, one aspect of the invention includes the realization that erroneous or unusually high voltages may be emitted from a combustion condition sensor such as the oxygen sensor 94 during the warm-up period when an engine is initially started. Such unusually high output voltages may not necessarily be generated by a combustion condition sensor which needs repair or replacement. Rather, such unusually high voltages can also be generated by properly operating combustion condition sensors or oxygen sensors. Thus, the present control routine 144 prevents maximum voltages from being saved if such voltages are generated during a warm-up period, thus preventing the use of such voltages in a diagnostic procedure.

Figure 10:
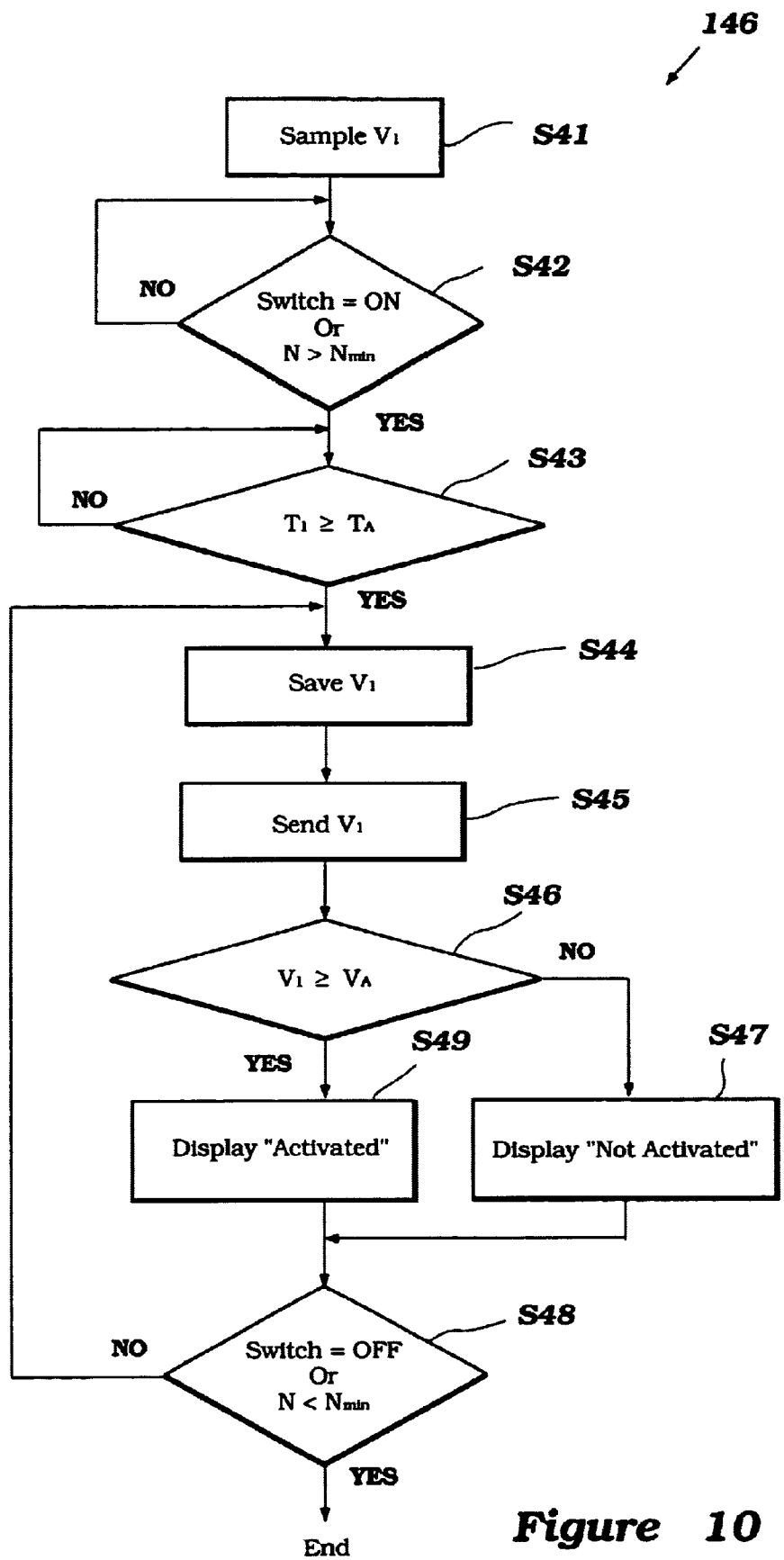
FIG. 10 is a modification of the routine illustrated in FIG. 6.

With reference to FIG. 10, a further modification of the routine 136 described above with reference to FIG. 6 is illustrated therein and referred to generally by the reference numeral 146. The routine 146 begins at a step S41. In the step S41, an output value $V_1$ of a combustion condition sensor, such as the oxygen sensor 94, is sampled. After the output value $V_1$ is sampled, the routine 146 moves on to a step S42.

In the step S42, it is determined whether the main switch is on and/or whether the engine speed N is above a minimum engine speed $N_{MIN}$. If it is determined that the switch is not moved to the on position and/or the engine speed N is not greater than a minimum engine speed $N_{MIN}$, the routine 146 returns to the step S42 and repeats. If, however, in the step S42, it is determined that the switch is on and/or the engine speed N is greater than a minimum engine speed $N_{MIN}$, the routine 146 moves on to a step S43.

In the step S43, it is determined whether the time $T_1$ at which the output value $V_1$ was sampled, is greater than or equal to a minimum time for actuation of the combustion condition sensor $T_A$. For example, the minimum time for actuation of the combustion condition sensor $T_A$ can be a predetermined period of time required for an oxygen sensor, such as the oxygen sensor 94, to begin to operate properly after having been energized. For example, it has been found that approximately one minute can serve as a minimum time period for actuation $T_A$ of a known oxygen sensor. If, in the step S43, it is determined that the time at which the output value $V_1$ as sampled is not greater than or equal to the minimum time for actuation $T_A$, the routine 146 returns to the step S43 and repeats. If, however, in the step S43, it is determined that the time $T_1$ is greater than or equal to the time $T_A$, the routine 146 moves on to a step S44.

In the step S44, the output value $V_1$ is stored. For example, the ECU 78 can store the output value $V_1$ in the memory device 114. After the step S44, the routine 146 moves on to a step S45.

In the step S45, the output value $V_1$ is sent to a monitoring device. For example, the output value $V_1$ can be transmitted to the computer 112 (FIG. 2) and displayed on the display 118. With reference to FIG. 5, the output value $V_1$ can be displayed as the "current value." After the step S45, the routine 146 moves on to a step S46.

In the step S46, it is determined whether the output value $V_1$ is greater than or equal to a minimum output value for actuation $V_A$ of a combustion condition sensor. For example, the ECU 78 or the computer 112 can compare the output value $V_1$ to a predetermined minimum activation voltage $V_A$ which corresponds to a minimum voltage required for the oxygen sensor 94 to operate properly. If it is determined that the output value $V_1$ is not greater than the minimum actuation value $V_A$, the routine 146 moves on to a step S47.

In the step S47, the monitoring device, such as the computer 112, displays a message that the combustion condition sensor is not yet activated. For example, the computer 112 can display a message that the oxygen sensor is not yet activated. After the step S47, the routine 146 moves on to a step S48.

In the step S48, it is determined whether the main switch has been turned off and/or whether the engine speed N is less than a minimum engine speed $N_{MIN}$. If it is determined that either or both of the above conditions are met, the routine 146 ends. If, however, in the step S48, it is determined that the main switch is off and/or the engine speed N is less than the minimum engine speed $N_{MIN}$, the routine 146 returns to the step S44 and repeats. If, in the step S46, it is determined that the output value $V_1$ is greater than or equal to the minimum actuation output value $V_A$, the routine 146 moves on to a step S49.

In the step S49, a monitoring device, such as the computer 112, displays a message that the combustion condition sensor, such as the oxygen sensor 94, has been activated. After the step S49, the routine 146 moves to the step S48 and either ends or repeats, as noted above.

Figure 11:
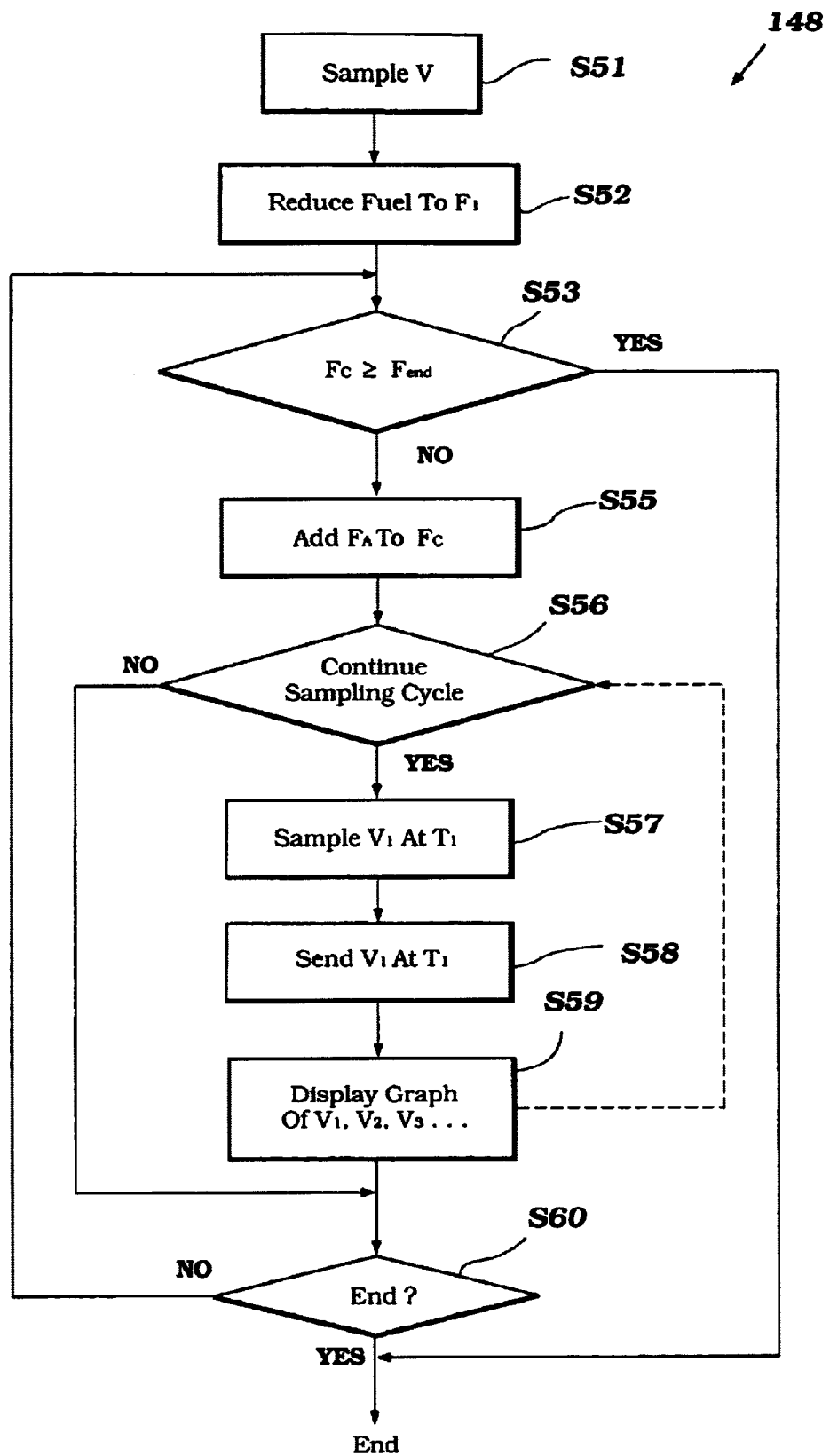
FIG. 11 is yet another modification of the routine illustrated in FIG. 6.

With reference to FIG. 11, a further modification of the routine 136 is illustrated therein, and referred to generally by the reference numeral 148. The routine 148 starts at a step S51. In the step S51, an output value of a combustion condition sensor is sampled at a predetermined rate. For example, the ECU 78 can sample the output voltage from the oxygen sensor 94 via the communication line 104 at a predetermined rate. After a sampling of the output value V has begun in the step S51, the routine 148 moves on to a step S52.

In the step S52, a fuel amount supplied to the combustion chamber corresponding to the combustion position sensor is reduced to an initial value $F_1$. For example, the ECU 78 can control the fuel injectors 82 such that the fuel injection duration corresponding to each combustion chamber is reduced to a predetermined initial value $F_1$. Preferably, the fuel amount $F_1$ is configured such that the resulting air/fuel charge delivered to the combustion chamber is a lean mixture. After the step S52, the routine 148 moves to a step S53.

In the step S53, it is determined whether a current fuel amount $F_C$ is greater than or equal to a final fuel amount $F_{END}$. For example, the ECU 78 or the computer 112 can compare a current fuel injection duration value used to control the fuel injectors 82 with a predetermined final fuel injection duration value $F_{END}$. If it is determined that the current fuel amount value $F_C$ is greater than or equal to the predetermined final fuel amount $F_{END}$, the routine 148 ends. However, if, in step S53, it is determined that the current fuel amount value $F_C$ is not greater or equal to the final fuel amount value $F_{END}$, the routine 148 moves onto a step S55.

In the step S55, a fuel amount increase value $F_A$ is added to the current fuel amount value $F_C$. For example, the ECU 78 increases the fuel injection duration, thereby moving the air fuel ratio towards a rich mixture. After the step S55, the routine 148 moves on to a step S56.

In the step S56, it is determined whether the sampling cycle should continue. For example, the ECU 78 or the computer 112 can be programmed to continue a sampling cycle for a predetermined number of samples of the output value V of a combustion condition sensor such as the oxygen sensor 94. If it is determined that the sampling cycle should continue, the routine 148 moves on to a step S57.

At the step S57, the output value $V_1$ of the combustion condition sensor is sampled at a time $T_1$. For example, the ECU 78 can sample the output voltage of the oxygen sensor 94 via the communication line 104. After the step S57, the routine 148 moves on to the step S58.

At the step S58, the sampled value $V_1$ at time $T_1$ is sent to the computer 112. After the step S58, the routine 148 moves on to a step S59.

At the step S59, the computer 112 displays a graph of the sampled voltages $V_1, V_2, V_3, \ldots$ correlated to the corresponding times $T_1, T_2, T_3, \ldots$ at which the voltages were sampled. Preferably, the computer 112 displays the voltages and corresponding times as a bar graph. It is to be noted that the cycle defined by steps S56–S59 can be performed once, thereby providing a single output value of the combustion condition sensor each time the current fuel amount $F_C$ is increased, or can be repeated a number of times, providing a plurality of output values of the corresponding combustion condition sensor each time the current fuel amount $F_C$ is increased in the step S55. After the step S59, the routine 148 moves on to a step S60.

In the step S60, it is determined whether the routine 148 should end. For example, a user operating the computer 112 may choose to terminate the routine 148. If it is determined that the routine 148 should end in the step S60, the routine 148 ends. If, however, in the step S60, it is determined that the routine 148 should not end, the routine 148 returns to the step S53 and repeats.

The present routine 148 allows an engineer or technician to predictably observe the operation of a combustion condition sensor, such as the oxygen sensor 94, during a transition from a lean to rich reversal. Thus, the engineer or technician can closely analyze the output and performance of such a combustion condition sensor.

Figure 12:
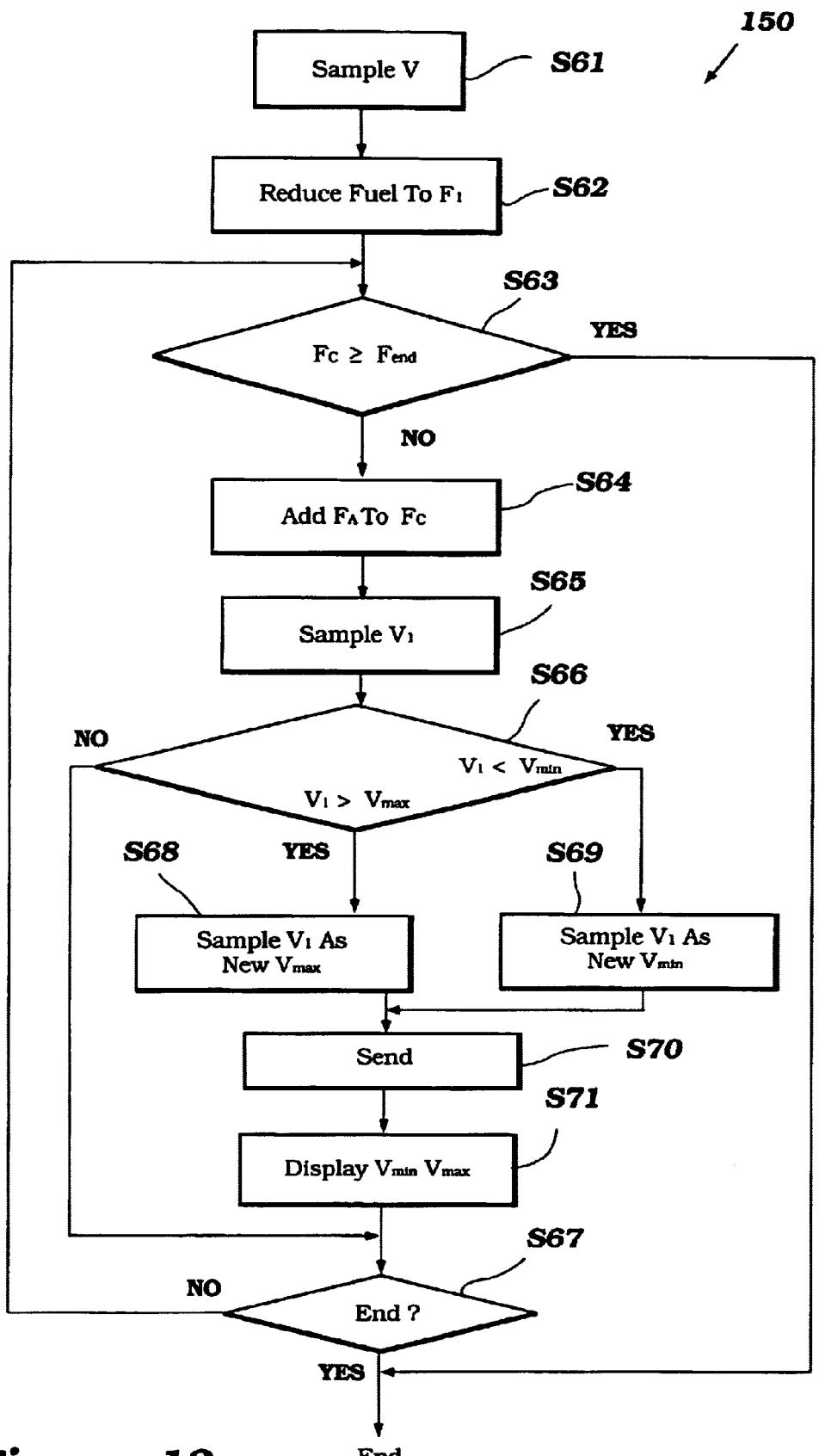
FIG. 12 is a further modification of the routine illustrated in FIG. 6.

With reference to FIG. 12, a further modification of the routine 136 is illustrated therein, and referred to generally by the reference numeral 150. The routine 150 begins at a step S61. In the step S61, an output value V of the combustion condition sensor, such as the output voltage of the oxygen sensor 94, is sampled at a predetermined rate. For example, the ECU 78 can begin sampling the output voltage of the oxygen sensor 94 via the communication line 104, at a predetermined rate. After the step S61, the routine 150 moves on to a step S62.

At the step S62, a fuel amount is reduced to an initial fuel amount value $F_1$, similar to the reduction of a fuel amount described above with reference to step S52 (FIG. 11). After the step S62, the routine 150 moves on to a step S63.

In the step S63, it is determined whether the current fuel amount $F_C$ is greater than or equal to a final fuel amount $F_{END}$ similarly to the comparison performed in the step S53 (FIG. 11). If it is determined that the current fuel amount is greater than or equal to the final fuel amount $F_{END}$, the routine 150 ends. If, however, it is determined that the current fuel amount $F_C$ is not greater than or equal to the final fuel amount $F_{END}$, the routine 150 moves on to a step S64.

In the step S64, a fuel amount increase value $F_A$ is added to the current fuel amount $F_C$, similarly to the increase performed in the step S55 (FIG. 11). After the step S64, the output value of a combustion condition sensor $V_1$ is sampled. After the step S65, the routine 150 moves on to a step S66.

In the step S66, it is determined whether the output value $V_1$ is greater than a predetermined maximum output value $V_{MAX}$ and if the output value $V_1$ is less than a predetermined minimum amount value $V_{MIN}$. If neither of these conditions are true, the routine 150 moves to a step S67.

In the step S67, it is determined whether the routine 150 should end, similarly to the step S60 (FIG. 11). If it is determined that the routine 150 should not end, the routine 150 returns to the step S63 and repeats.

If, however, it is determined in the step S66 that the output value $V_1$ is greater than a predetermined maximum output value $V_{MAX}$, the routine 150 moves on to a step S68.

In the step S68, the output value $V_1$ is saved as a new maximum output value $V_{MAX}$. For example, as described above with reference to FIG. 6, the ECU 78 can store the output value $V_1$ as a maximum output value $V_{MAX}$ in the memory device 114. Such a maximum output value can correspond to a maximum output voltage of the oxygen sensor 94. Similarly, if it is determined, in the step S66, if the output value $V_1$ is less than a predetermined minimum output value, $V_{MIN}$, the routine 150 moves on to a step S69.

In the step S69, the output value $V_1$ is stored as a new predetermined minimum output value $V_{MIN}$. After the steps S68, S69, the routine 150 moves on to a step S70.

In the step S70, the newly stored minimum output value $V_{MIN}$ or the maximum output value $V_{MAX}$ is sent to the computer 112. After the step S70, the routine 150 moves on to a step S71.

In the step S71, the computer 112 displays the current minimum and maximum output values $V_{MIN}$, $V_{MAX}$. After the step S71, the routine moves on to the step S67 and either ends or repeats.

It can be appreciated that the routine 150 allows an engineer or a technician to record the generation of new maximum and minimum output values $V_{MAX}$, $V_{MIN}$ which may be generated when the air fuel ratio is changed between two values.

Figure 13:
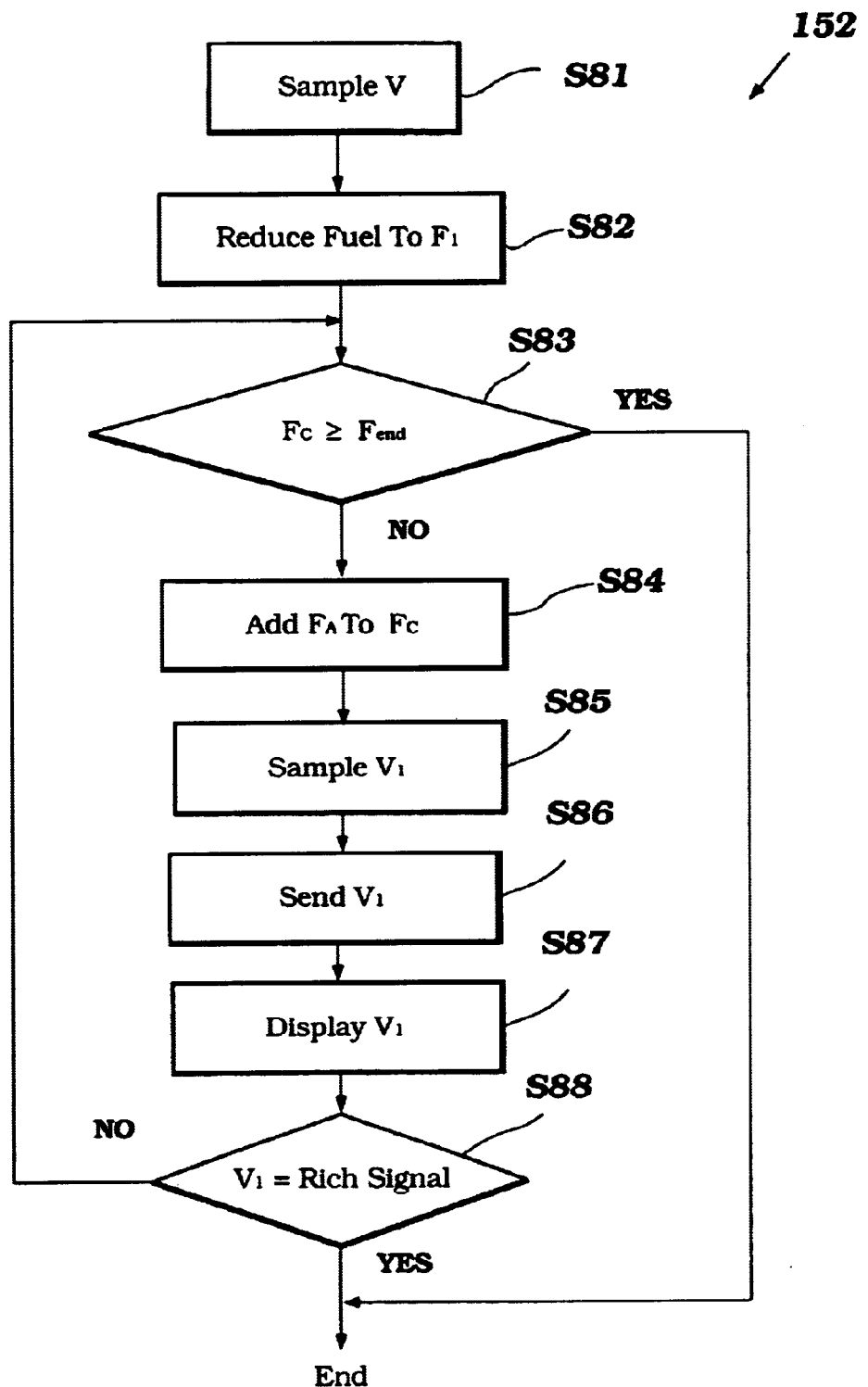
FIG. 13 is yet another modification of the routine illustrated in FIG. 6.

With reference to FIG. 13, yet another modification of the routine 136 is illustrated therein, and referred to generally by the reference numeral 152. The routine 152 begins at a step S81. In the step S81, sampling of the output of a combustion condition sensor is started, and can be performed in accordance with the description set forth above with respect to step S61 (FIG. 12). After the step S81, the routine 152 moves on to a step S82.

In the step S82, a fuel amount is reduced to an initial fuel amount value $F_1$, similarly to the reduction performed in the step S62 (FIG. 12). After the step S82, the routine 152 moves on to a step S83.

In the step S83, a current fuel amount $F_C$ is compared to a final fuel amount $F_{END}$, similar to the comparison performed in the step S63 (FIG. 12). If it is determined that the current fuel amount $F_C$ is greater than or equal to the final fuel amount $F_{END}$, the routine 152 ends. If, however, it is determined that the current fuel amount $F_C$ is not greater than or equal to the final fuel amount $F_{END}$, the routine 152 moves on to a step S84.

In the step S84, a fuel amount increase $F_\Delta$ is added to the current fuel amount $F_C$ similar to the increase performed in the step S64 (FIG. 12). After the step S84, the routine 152 moves on to a step S85.

At the step S85, the output value $V_1$ of a combustion condition sensor, such as the output voltage of the oxygen sensor 94, is sampled, similar to the sampling performed in the step S65 (FIG. 12). After the step S85, the routine 152 moves on to a step S86.

In the step S86, the output value $V_1$ is sent to the computer 112. For example, the ECU 78 can send the sampled output value $V_1$ to the computer 112 via a communication line 124 (FIG. 2). After the step S86, the routine 152 moves on to a step S87.

In the step S87, the computer 112 displays the output value $V_1$ on the display 118. After the step S87, the routine 152 moves on to a step S88.

In the step S88, the output value $V_1$ is compared to the predetermined output value known to correspond to the combustion of a rich air fuel mixture. If it is determined, in the step S88, that the output value $V_1$ does not correspond to a rich output value, the routine 152 returns to the step S83 and repeats. If, however, the output value $V_1$ is determined to correspond to an output value corresponding to the combustion of a rich air fuel mixture, the routine 152 ends.

The present routine 152 allows an engineer or a technician to predictably observe the change of output value of a combustion condition sensor, such as the oxygen sensor 94, as the air fuel mixture combusted in the combustion chamber changes from lean to rich. Thus, the engineer or technician can more reliably analyze the performance of a combustion condition sensor, such as the oxygen sensor 94.

Although this invention has been disclosed in the context of a certain preferred embodiment, modifications thereof, and specific examples, it will be understood by those skilled in the art that the present invention extends beyond the specifically disclosed embodiment, to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Moreover, many of the steps of the routines described above can be performed in various orders, as will be well understood by one skilled in the art from the above description, while still carrying out one or more objects or advantages of the present invention. Thus, it is intended that the scope of the present invention herein disclosed should not be limited by the particular disclosed embodiment described above, but should be determined only by a fair reading of the claims that follow.

What is claimed is:

1. A method for the diagnosing an operation of an oxygen sensor used within an engine that defines a combustion chamber for combusting air/fuel mixtures, the engine also including an electronic controller configured to control at least one operational characteristic of the engine and to store at least one output value from the oxygen sensor, the method comprising connecting a computer having a display to the electronic controller, loading the stored output value from the electronic controller to the computer, comparing the output value to a predetermined value and determining whether the sensor has malfunctioned based on the comparison.

2. The method according to claim 1, wherein the step of comparing comprises comparing the output value with at least one of a predetermined maximum output value of the oxygen sensor and a predetermined minimum output value of the oxygen sensor.

3. The method according to claim 2 additionally comprising saving the output value if the output value is greater than the predetermined maximum output value or less than the predetermined minimum output value.

4. The method according to claim 3 additionally comprising saving a time at which the output value was sampled.

5. The method according to claim 1 additionally comprising determining if the output value of the oxygen sensor has switched from a first output range to a second output range.

6. The method according to claim 5, wherein the first output range corresponds to the combustion of a rich air fuel mixture, the second output range corresponding to the combustion of the lean mixture.

7. The method according to claim 5 additionally comprising determining a time over which the output value of the oxygen sensor switched from the first output range to the second output range.

8. The method according to claim 5 additionally comprising saving, to a storage device, the time over which the output value switches.

9. The method according to claim 1 additionally comprising storing the output value to a storage device.

10. The method according to claim 9 additionally comprising determining if a predetermined time period has expired.

11. The method according to claim 10 additionally comprising preventing the output value from being stored if the predetermined time period has not expired.

12. The method according to claim 11, wherein the predetermined time period corresponds to a time period required for the engine to reach operational temperature.

13. A method for diagnosing an operation of an oxygen sensor used within an engine that defines a combustion chamber for combusting air/fuel mixtures and a fuel supply system for supplying fuel for the air/fuel mixtures, the engine also including an electronic controller configured to control at least one operational characteristic of the engine and to store at least one output value from the oxygen sensor, the method comprising setting a first fuel amount of fuel supplied to the combustion chamber, adjusting the fuel amount, storing an output value of the oxygen sensor in the electronic controller, connecting a computer having a display to the electronic controller, loading the stored value from the controller to the computer, and determining whether the sensor malfunctioned based on the stored output value.

14. The method according to claim 13, wherein setting a first fuel amount comprises controlling the fuel supply system to create a lean air/fuel mixture in the combustion chamber.

15. The method according to claim 14, wherein adjusting the fuel amount comprises increasing the first fuel amount so as to change an air/fuel ratio of the air/fuel mixtures.

16. The method according to claim 13, wherein storing an output value comprises sampling an output signal of the combustion condition sensor before the fuel amount is adjusted.

17. The method according to claim 16 additionally comprising sampling an output signal of the oxygen sensor after the fuel amount is adjusted.

18. A diagnostic system for diagnosing an oxygen sensor, comprising a controller configured to control at least one operational characteristic of an engine which defines at least one combustion chamber configured for combustion of an air/fuel mixture therein and to store an output value of the oxygen sensor, and a computer configured to be connected to the controller and to load the stored output value from the controller for comparison to a predetermined value to determine if the oxygen sensor has malfunctioned.

19. The diagnostic system according to claim 11, wherein the output value is a voltage.

20. The diagnostic system according to claim 18, wherein the computer is configured to compare the output value to at least one of a predetermined maximum output value and a predetermined minimum output value.

21. The diagnostic system according to claim 18, wherein the controller is configured to determine the time required for the oxygen sensor to switch from a first output value to a second output value.

22. The diagnostic system according to claim 21, wherein the first output value corresponds to the detection of the combustion of a rich air fuel mixture.

23. The diagnostic system according to claim 21, wherein the second output value corresponds to the detection of the combustion of a lean air fuel mixture.

24. The diagnostic system according to claim 21, wherein the controller is configured so as to not save the output value if a predetermined time period has not elapsed.

25. The diagnostic system according to claim 21, wherein the predetermined time period is the time required for the engine to reach a proper operational temperature.

26. The diagnostic system according to claim 21, wherein the predetermined time period is the time required for the oxygen sensor to reach a proper operating temperature.

27. A diagnostic system for diagnosing an oxygen sensor, comprising a controller configured to control a fuel supply system of an engine which defines at least one combustion chamber configured for combustion of an air/fuel mixture therein, the controller being configured to control the fuel supply system so as to create at least one of a lean air/fuel mixture and a rich air/fuel mixture in the combustion chamber, adjust the air/fuel mixture, and determine a time required for the combustion condition sensor to switch from a first output value corresponding to the detection of the combustion of a lean air/fuel mixture, to a second output value corresponding to the detection of the combustion of a rich air/fuel mixture.

28. A diagnostic system for diagnosing an oxygen sensor, comprising a controller configured to control at least one operational characteristic of an engine which defines at least one combustion chamber configured for combustion of an air fuel mixture therein, the controller being configured to determine an output value of the oxygen sensor and including means for loading the output value to a computer having a display for comparison of the output value to a predetermined value and means for determining whether the oxygen sensor has malfunctioned based on the comparison.

29. The diagnostic system according to claim 21 additionally comprising means for determining if the output value is at least one of greater than a predetermined maximum output value and less than a predetermined minimum output value.

30. The diagnostic system according to claim 21 additionally comprising means for storing the output value.

31. The diagnostic system according to claim 30 additionally comprising means for preventing the output value from being stored if a predetermined time period has not elapsed.

* * * * *

UNITED STATES PATENT AND TRADEMARK OFFICE
CERTIFICATE OF CORRECTION

PATENT NO.    : 6,688,163 B2
DATED         : February 10, 2004
INVENTOR(S)   : Kenichi Fujino et al.

It is certified that error appears in the above-identified patent and that said Letters Patent is hereby corrected as shown below:

<u>Title page,</u>
Item [75], Inventors, please change inventor's name from "Kitoshi Motose" to
-- Hitoshi Motose --

Signed and Sealed this

Thirteenth Day of July, 2004

JON W. DUDAS
*Acting Director of the United States Patent and Trademark Office*